United States Patent
Di Censo et al.

(10) Patent No.: US 9,727,129 B2
(45) Date of Patent: Aug. 8, 2017

(54) SYSTEM AND METHOD FOR AUDIO AUGMENTED REALITY

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 115 days.

(21) Appl. No.: 14/318,038

(22) Filed: Jun. 27, 2014

(65) Prior Publication Data

US 2015/0025662 A1    Jan. 22, 2015

Related U.S. Application Data

(60) Provisional application No. 61/841,277, filed on Jun. 28, 2013.

(51) Int. Cl.
*G06F 17/00* (2006.01)
*G06F 3/01* (2006.01)

(52) U.S. Cl.
CPC .................................. *G06F 3/011* (2013.01)

(58) Field of Classification Search
CPC ....................................................... G06F 3/011
USPC ............................... 700/94; 455/456.1–466; 348/14.01–14.16; 370/351–357, 370/259–271; 379/37–52, 67.1–88.28, 379/201.01; 704/270–278; 709/201–207, 709/217–248
See application file for complete search history.

(56) References Cited

U.S. PATENT DOCUMENTS

| | | | | |
|---|---|---|---|---|
| 7,480,512 B2* | 1/2009 | Graham | ................ | G01C 21/26 342/357.31 |
| 7,787,887 B2* | 8/2010 | Gupta | ................... | H04L 67/18 455/456.1 |
| 7,962,284 B2* | 6/2011 | Cutitta, II | ........... | G08G 1/0962 340/539.11 |
| 8,005,489 B2* | 8/2011 | Fransioli | ......... | H04L 29/12311 455/456.1 |
| 8,099,105 B2* | 1/2012 | Morin | .................... | H04W 4/02 455/456.1 |
| 8,131,750 B2* | 3/2012 | Bathiche | .......... | G06F 17/30525 348/231.5 |
| 8,275,414 B1* | 9/2012 | Athsani | ................... | G06F 3/011 455/418 |
| 8,401,530 B2* | 3/2013 | Radlinger | ............. | G06Q 30/02 455/403 |
| 8,406,791 B1* | 3/2013 | Daily | .................... | H04M 3/493 379/88.06 |
| 8,428,621 B2* | 4/2013 | Vorbau | ............. | G06F 17/30749 455/456.3 |
| 8,468,012 B2* | 6/2013 | Lloyd | .................. | G10L 15/065 704/246 |

(Continued)

*Primary Examiner* — Hemant Patel
(74) *Attorney, Agent, or Firm* — Artegis Law Group, LLP

(57) ABSTRACT

A system, controller, and computer readable medium for providing an audio augmented reality to a user. The system can detect an object, event, or the like in the environment of a user and play a digitized sound and/or a synthesized sound in response to the detected object, event, or the like. The user can specify preferences for sounds played in response to the detected object or event.

19 Claims, 6 Drawing Sheets

(56) References Cited

U.S. PATENT DOCUMENTS

| | | | | |
|---|---|---|---|---|
| 8,634,852 B2* | 1/2014 | Farmer | ............... | G01C 21/3602 |
| | | | | 382/255 |
| 8,660,581 B2* | 2/2014 | Davis | ................... | H04W 4/023 |
| | | | | 367/118 |
| 8,781,436 B2* | 7/2014 | Rega | ................. | H04M 1/72566 |
| | | | | 455/404.1 |
| 8,792,921 B2* | 7/2014 | Drennan | ................. | H04W 4/02 |
| | | | | 455/455 |
| 8,929,807 B2* | 1/2015 | Brillhart | ................ | H04H 40/00 |
| | | | | 340/384.7 |
| 8,971,917 B2* | 3/2015 | Andrews | ................. | H04W 4/02 |
| | | | | 455/456.1 |
| 2006/0089160 A1* | 4/2006 | Othmer | ............. | H04M 1/72572 |
| | | | | 455/457 |
| 2007/0161382 A1* | 7/2007 | Melinger | ................ | H04L 67/18 |
| | | | | 455/456.1 |
| 2010/0257252 A1* | 10/2010 | Dougherty | ......... | G06K 9/00979 |
| | | | | 709/217 |
| 2011/0257974 A1* | 10/2011 | Kristjansson | ....... | G10L 21/0208 |
| | | | | 704/246 |
| 2013/0030557 A1* | 1/2013 | You | ........................ | G11B 19/08 |
| | | | | 700/94 |
| 2013/0263016 A1* | 10/2013 | Lehtiniemi | ........... | G06T 19/006 |
| | | | | 715/753 |

* cited by examiner

SYSTEM AND METHOD FOR AUDIO AUGMENTED REALITY

RELATED APPLICATIONS

This application claims the benefit of U.S. Provisional Application Ser. No. 61/841,277, filed on Jun. 28, 2013, the entire contents of which are incorporated herein by reference.

TECHNICAL FIELD

The present disclosure generally relates to manipulation or enhancement of a user's audio environment to provide a user selected or controlled audio experience.

BACKGROUND

Various types of augmented reality systems have been developed which combine digitally generated audio and/or video with the real-time audio and video that a user perceives in a particular location or environment. For example, an augmented reality tour may use the camera and microphone of a smart phone to capture real-time audio and video while combining or overlaying interesting facts based on the location or position of the user, or based on a button-press or voice request for additional information. In one prototype of an audio augmented reality system, microphone equipped headphones are used to provide a framework for experiments including real-time audio alteration, multi-modal sensory integration, and collaborative listening experiences.

SUMMARY

A system for modifying user perception of an audio environment includes at least one audio input transducer and at least one audio output transducer in communication with a processor configured to provide audio output to a user. The processor is configured to receive information representing an audio enhancement from a remote auditory event repository and combine the audio event information with signals associated with local sounds represented by signals received from the one or more audio input transducers. A sound renderer generates signals for the one or more audio output transducers to provide an audio augmented reality experience to the user. In various embodiments, a transceiver communicates with one or more remote auditory event repositories over a wireless network, such as a cellular network or Wi-Fi network. The system may include a user interface to select or specify user preferences with respect to particular sound effects. Various embodiments include a user interface having an audio mixer with one or more inputs to adjust the relative contributions of various augmented and local auditory sources. Embodiments may also include one or more context sensors, such as a camera, microphone(s), and/or GPS receiver, to determine current user location and/or context. GPS as noted herein generally refers to any and/or all global navigation satellite systems, which include GPS, GLONASS, Galileo, BeiDou, etc. Auditory event menus may be automatically selected or presented based on user location or context. In various embodiments, the system is implemented in a user wearable headset, which may include circumaural, supra-aural, in-the-ear, or body mounted speakers with one or more microphones or similar audio input devices to detect ambient sounds, which may include user speech. The system may include voice or speech recognition to provide voice activated control of the user interface, for example.

A method for modifying user perception of an audio environment includes receiving information representing an auditory event from a remote auditory repository, compositing the information with information representing a local audio environment, rendering sound from the composite information, and generating audio signals for one or more output transducers. In various embodiments, the method may include configuring a local sound synthesizer to adjust relative contributions of local and remote auditory events. The method may include receiving input from one or more context sensors, such as a camera, microphone, accelerometer, or GPS module, determining a local context based on the received context input, and automatically adjusting the auditory environment based on the context.

Various embodiments may provide one or more advantages. For example, use of a wearable device that may modify user perception of an audio environment by accessing remote auditory repositories which provide a virtually unlimited source of audio enhancements. The system or method may be used in conjunction with various wearable systems, such as a head-mounted display system similar to Google® Glass®, since it extends vision focused augmented systems with a sophisticated auditory augmented reality element. Various embodiments allows a user to selectively modify the sounds he is perceiving so that the user can selectively cancel, attenuate, enhance, or add auditory events (sound, noises, music, voices, etc.), which may result in improved hearing capabilities and auditory user experiences.

Embodiments of systems can include a computer processor, a user interface that enables a user to enter at least one user preference, and a memory module that can store the at least one user preference. The systems can also include an audio transducer that can output sounds to the user. The systems can also include at least one context sensor that can detect objects, events, or other environmental contexts of the user. The systems can also include at least one database that can store data structures, each of which can enable production of a sound through the at least one acoustic transducer when processed by the computer processor. The computer processor can select and process at least one of the data structures based on a determined location and/or environmental context of the user and based on the user preferences.

Embodiments of controllers can include a first signal input that can receive a first signal that indicates at least one user preference. The controllers can also include a second signal input that can receive at least one of a location and an environmental context. The controllers can also include a signal output that can be configured to drive an acoustic transducer. The controllers can also include computer logic (e.g., in a computer processor) that can process a data structure based on the user preferences and based on the received at least one of a location and an environmental context. Each data structure, when processed, can output an audio signal.

Embodiments of a computer readable medium can include a program which, when processed by one or more processors, can perform an operation that includes receiving at least one user preference. The operation can also include determining at least one of a location and an environmental context. The operation can also include selecting a data structure from a plurality of data structures, based on the received user preferences and the determined at least one of a location and an environmental context. The operation can also include processing the selected data structure to generate an audio signal.

The above advantages and various other advantages and features may be apparent from the following detailed description of one or more representative embodiments when taken in connection with the accompanying drawings.

DETAILED DESCRIPTION

Figure 1:
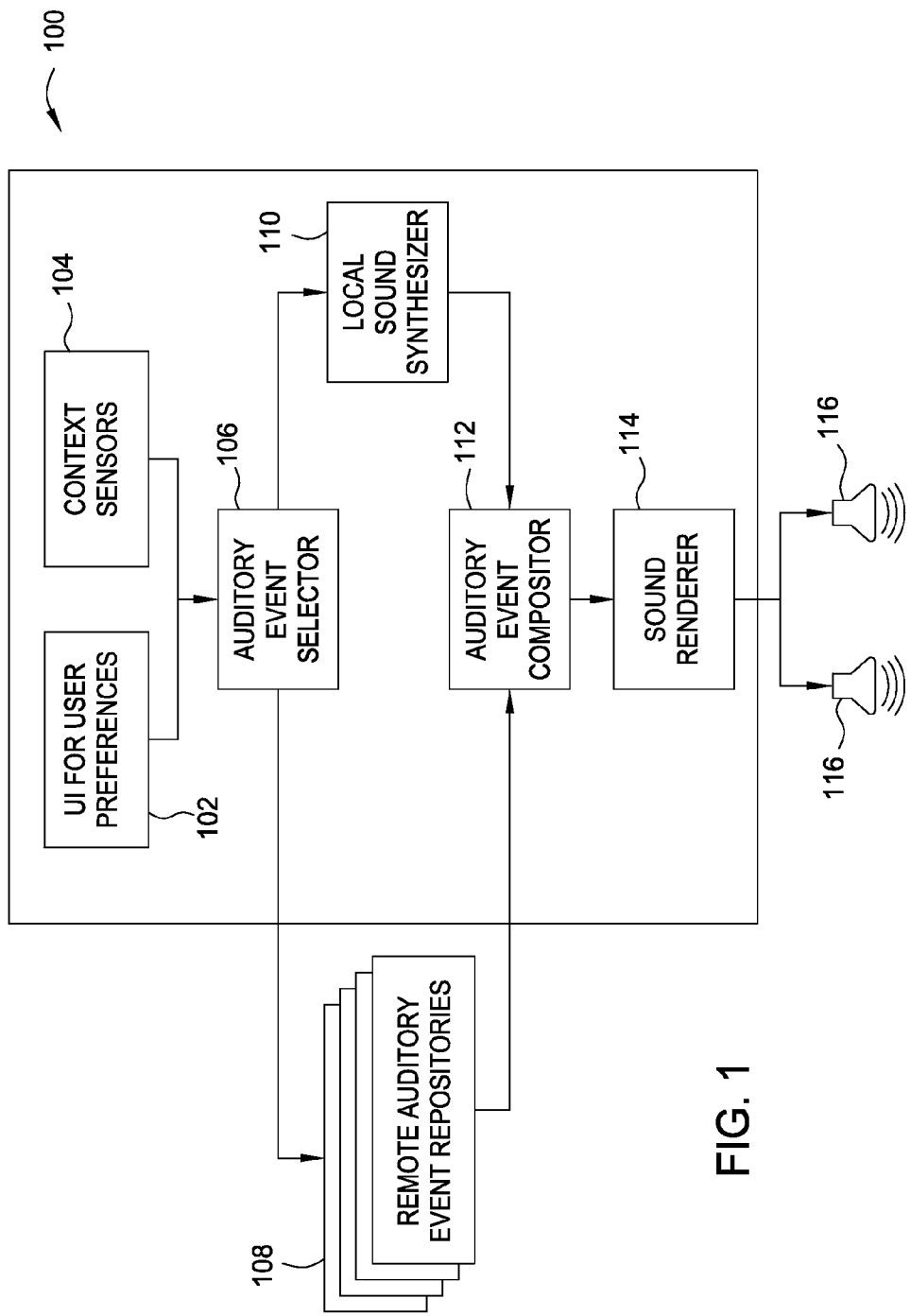
FIG. 1 is a block diagram of components of embodiments of augmented reality systems described herein.

Representative embodiments are described in detail. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can often be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Various embodiments may include a controller or control circuitry, either of which may include a microprocessor or central processing unit (CPU) in communication with various types of computer readable storage devices or media. Computer readable storage devices or media may include volatile and nonvolatile storage in read-only memory (ROM) and random-access memory (RAM), for example. Computer-readable storage devices or media may be implemented using any of a number of memory devices such as PROMs (programmable read-only memory), EPROMs (electrically PROM), EEPROMs (electrically erasable PROM), flash memory, or any other electric, electronic, magnetic, optical, or combination memory devices capable of storing data, some of which represent executable instructions, used by the controller or processing circuitry. The embodiments of the present disclosure generally provide for a plurality of circuits or other electrical devices. All references to the circuits and other electrical devices and the functionality provided by each, are not intended to be limited to encompassing only what is explicitly illustrated and described. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired.

Control logic or functions performed by a processor, processing circuitry, or other control circuitry may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described, but is provided for ease of illustration and description. The control logic may be implemented primarily in software executed by a microprocessor-based controller. Of course, the control logic may be implemented in software, hardware, or a combination of software and hardware in one or more controllers or processors depending upon the particular application. When implemented in software, the control logic may be provided in one or more computer-readable storage devices or media having stored data representing code or instructions executed by a computer.

Embodiments of a system or method for modifying a user auditory environment based on user selectable and/or context specific information may include a wearable system which (among other things) is able to add or combine auditory events to the user auditory perception. In general, the system and method may combine auditory events available from a remote repository by connecting to a server or other repository over a wireless network, such as a cellular or Wi-Fi network, for example. Alternatively, or in combination, the system may modify the user's auditory environment using local sources or creating audio events locally through a synthesizing process.

One component of an audio or auditory augmented reality (AAR) system or method can include an auditory event selector. The auditory event selector can receive an input from the user preferences (dynamically and on-the-fly specified via a user interface, e.g., from a smart phone that has sliders for certain audio event categories) and context sensors (location, orientation, external awareness sensors, etc.). The auditory event selector may then determine what auditory events are needed or desired, and either fetches them from external (remote) locations, and/or uses an internal mechanism to generate them (e.g., various types of sound and audio synthesizers). An auditory event compositor then combines all audio sources, and the sound renderer finally creates the sounds that are played back to the user using one or more output transducers. As generally described above, the various functions may be implemented in hardware and/or software depending on the particular application and implementation.

The hardware components of a representative AAR system or method may be embodied in various ways, including, e.g., 1) In-ear-canal systems, e.g., ear-fitting headphones, in-ear-canal hearing aid type devices, in-ear monitors, etc., where all sounds are physically blocked and filtered before they enter the ear canal and manipulated where needed or desired to achieve a particular modified auditory environment; 2) Over-ear isolating headphones (circumaural headphones) with external facing microphones that can act just like an in-ear-canal system, but with a more cumbersome and clearly visible hardware (ear cups, headband); 3) Body-mounted AAR speakers where the speakers are wearable and located on the shoulders or around the head of the user, and which may optionally track the user's ears and deliver sound waves directly to the user's ears' and 4) Environment-mounted AAR systems which leverage highly directional, mechanically actuated speakers or speakers with a highly directional steerable sound beam (e.g., based on a speaker array) that may optionally track a user's ears and deliver sound waves directly to the users' ears.

An AAR system, independently from the chosen embodiment, can actively and selectively add sounds (auditory events) to the user's auditory field by leveraging the user facing loudspeaker(s). Although headphones have a similar function since they play back music or other audio streams (phone calls, recordings, spoken language digital assistant, etc.), an AAR system or method according to embodiments of this disclosure modifies or enhances the audio environment according to user preferences using previously stored or in real-time synthesized audio events.

The auditory events that a user may add to his/her auditory field can vary widely from nature sounds such as birds twitting, rain noise, waves crashing sounds, wind blowing in the trees, to music or voices of narrators reading audio books. The selected auditory events may include brief sound events, e.g., for alerting, or continuous sound events such as wind blowing, ocean waves, etc. These sounds are not necessarily static, but may be location and situation specific, and are created from a high level user interface where the user specifies her preferences.

Auditory events may have a utility which is triggered by other sensors, e.g., an audio event that emphasizes a danger (e.g., an approaching car) based on the detection of an approaching car. Other sound events have a more mood enhancing function and serve purely to "beautify" the auditory scenery (e.g., cover or remove road construction noise). Yet other sound events simply modify the auditory scenery of a user in a personalized way (e.g., the user may prefer hearing specific nature sounds when in an urban area).

Auditory events may be highly context and location sensitive, and in some embodiments may be interactive (i.e., reacting to the user and the environment directly and in real time). In some embodiments, these auditory events are rendered in a spatially correct (binaural) way with regards to the scenery (e.g., appear to come from a consistent direction regardless of the user's head orientation and position).

To provide the user with a wide variety of sound events, the system is able to use multiple ways to retrieve or render these sounds. Therefore, the origin of sounds may vary depending upon the particular application and implementation. For example, auditory events can be fetched from a remote location such as a remote server, or auditory events can be synthesized locally by the system. For example, auditory events may be retrieved or streamed from remote locations that may include, repositories of generic sound events (sound effects, etc.), libraries of specific sound types (e.g., music servers, audio book servers, etc.), remote locations that synthesize specific sounds on the fly (such as remote text-to-speech servers), or remote microphones that can provide auditory context (e.g., the current ambient sound and/or noise level in a specific restaurant). Locally generated auditory sounds or events may include a synthesizer on the device which can create discrete sound (e.g., alerts, beeps, etc.), a synthesizer that can create continuous sound events (such as wind and ocean noises, similar to sleep relaxation sounds), synthesizers that can dynamically render specific sound events such as human speech (text-to-speech synthesizers), or dynamically generated music (based on sound libraries, or low level using MIDI).

Sound events may be synthesized on a low level, or concatenated from shorter digitized segments, or may be entirely digitized. In various embodiments, the system may include multiple devices that work together to provide the desired functionality, e.g., the head worn device (i.e., headphones) may communicate with external devices for additional processing power. For example, the synthesizer may reside on a smart phone, a smart watch, head mounted display, or any other wearable or body worn device.

Figure 2:
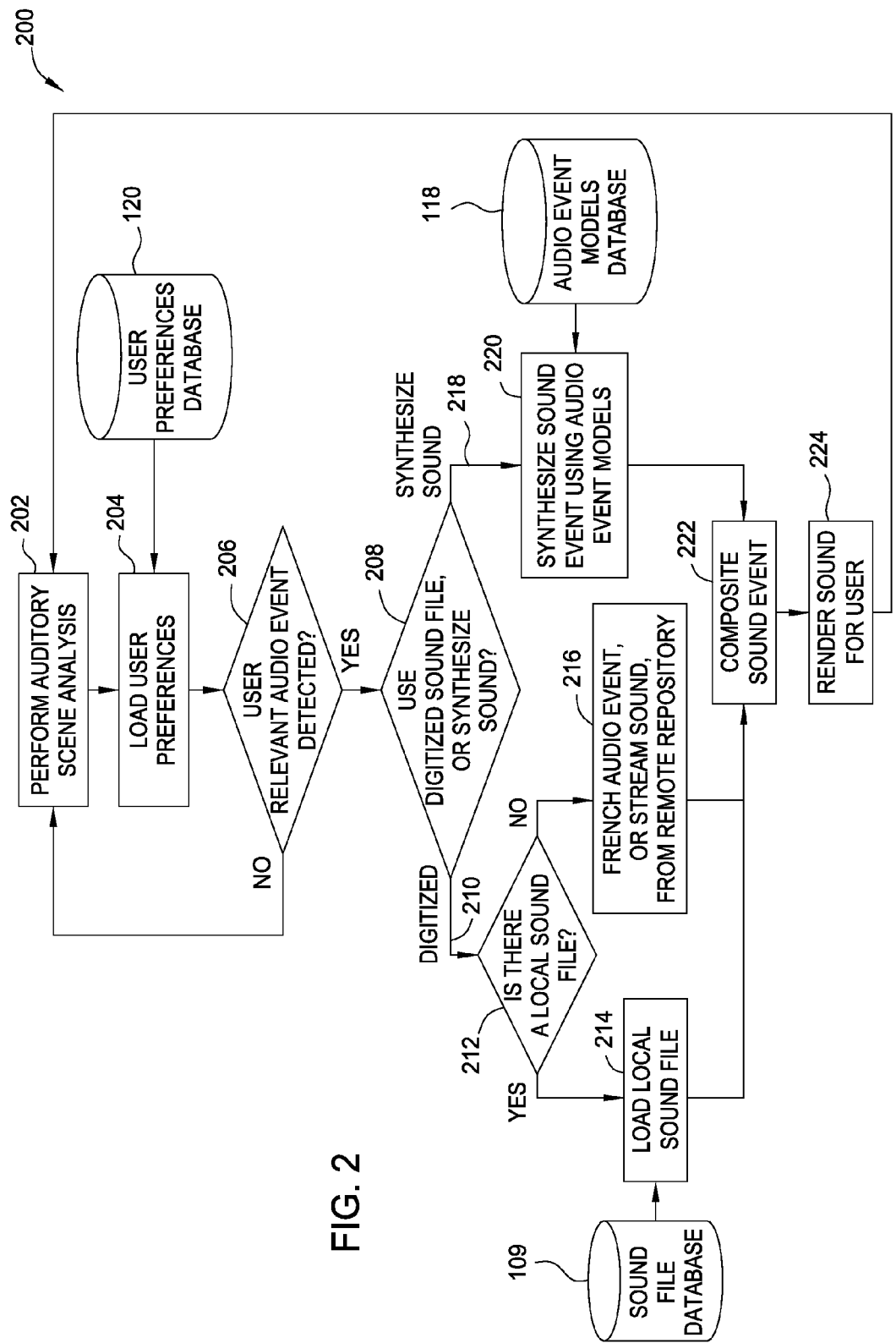
FIG. 2 is a flow chart for a process used by embodiments of augmented reality systems.

The following is a representative use scenario for various embodiments of an AAR system or method having user selectable auditory characteristics as generally illustrated in FIG. 2. The user is wearing his in-ear-canal AAR system and wants to add the sound of crashing waves in the background of his auditory field as indicated by the user via the user interface. The AAR system keeps the user's auditory field as it is and adds the synthesized sound of waves at a lower volume than the rest of the auditory events.

As illustrated by the representative embodiments described above, a system or method for modifying a user auditory environment provides an AAR device capable of delivering a wide variety of auditory events to the user that are context and location sensitive or aware. Some auditory events can be streamed or downloaded from a remote site, while others may better be synthesized locally to make them even more personalized and (in some embodiments) interactive. The disclosed embodiments complement vision focused wearable AR systems like Google® Glass®. The user has the ability to synthesize sounds or other auditory events (such as nature noises, voices, music, etc.) directly on his/her AAR system rather than only fetching them from a remote location.

Referring now to FIG. 1, a system 100 for providing audio augmented reality can include a user interface 102 for a user to input preferences. For example, the user interface 102 can include a touch screen display that allows a user to select and/or modify sounds heard by the user. The system 104 can also include one or more context sensors 104. For example, the context sensor(s) 104 may include one or more microphones that can detect sounds in a user's environment. In certain embodiments, the microphones can be highly sensitive such that they detect sounds that would be inaudible to human ears. As another example, the context sensor(s) 104 may include one or more digital imagers (e.g., digital cameras) that can capture images of the user's environment. In various embodiments, the digital imager(s) may include sensors that are sensitive to visible light, ultraviolet light, infrared light, and/or other light spectrums. As another example, the context sensor(s) 104 can also include a global positioning system (GPS) receiver. The GPS receiver can detect a location of the system 100 (and therefore the user).

Data from the user interface 102 and the context sensors 104 can be input into an audio event selector 106 (e.g., a computer processor, a controller, or the like) that can determine what sound or sounds to play to the user. The audio event selector 106 can select and/or combine sounds from multiple sources, including remote auditory event repositories 108 and a local sound synthesizer 110. The remote auditory event repositories 108 can include one or more databases that can store computer readable data structures (e.g., computer files). Each data structure may comprise a computer readable audio file (e.g., an .MP3 file, a .WAV file, etc.) when processed by a computer processor. For example, the audio event selector 106 could execute an application that processes an MP3 file to generate an audio signal. Each data structure may comprise a sound synthesizer model that can be processed by the local sound synthesizer 110. As described in greater detail below, the local sound synthesizer 110 can operate on a sound synthesizer model to create and modify a particular sound associated with a sound synthesizer model. In various embodiments, the local sound synthesizer could be an application that is executed by the audio event selector to process the sound synthesizer models and generate an audio signal. The system can include an auditory event compositor 112 that can combine sounds from remote auditory event repositories 108 and/or the local sound synthesizer 110. The system can further include a sound renderer 114 that can prepare the audio for presentation. For example, the sound renderer 114 may perform digital-to-analog conversion and/or amplification on the audio signal output by the auditory event compositor 112. The sound renderer 114 can output a signal to one or more audio transducers 116 (e.g., speakers) that present the sound to the user. The audio transducers 116 can be arranged in over-the-ear or on-the-ear headphones, in-the-ear headphones (i.e., ear buds), speakers in a car, etc.

FIG. 2 depicts a flow chart for a process 200 that embodiments of the system 100 may perform to provide audio augmented reality to a user. In block 202, the system can perform a scene analysis using the context sensors. Using the context sensors 104, the system 100 can identify a context of the user's environment. For example, as discussed in greater detail below with respect to FIGS. 3A, 4A, and 5A, the context sensors may detect (e.g., hear using a microphone and/or see using a digital imager) a nearby thunderstorm, an aircraft flying overhead, or bird singing in nearby trees. The context sensors may also determine a user's location (e.g., from a GPS receiver) and determine whether any landmarks, such as Big Ben, are nearby. For example, the system 100 may communicate with a database that stores georeferenced landmarks (i.e., landmarks and their associated locations) and may analyze the database to determine whether any landmarks are within a predefined distance of the user. In block 204, the system 100 can load user preferences (if they exist) for a particular context and/or class of context. The system may include a user preference database 120 that can store user preferences that have previously been set by a user using the user interface 102, for example. In block 206, in the event a context relevant to the user (e.g., according to user preferences) is detected, the system 100 can move to block 208 to prepare sounds to play to the user.

In block 208, the system 100 can initiate the preparation of two types of sound—a digitized sound 210 and a synthesized sound 218. As described above, a digitized sound 210 can be sourced from a data structure, such as an .MP3 or .WAV file. In block 212, the system 100 can determine whether a particular file is stored locally or remotely. If the particular file is stored locally, then in block 214, the system 100 can retrieve the file from a local sound file database 109. Otherwise in block 216, the system 100 can use a data transceiver (e.g., a Wi-Fi and/or cellular data connection) to retrieve the file from a remote database stored on one or more remote computer systems. For example, the system 100 may download or stream the file from the remote database. As described above, a synthesized sound 218 can be generated from a computer model for a particular sound. The computer model can include a mathematical model that can be adjusted and/or processed to output a waveform that synthesized a particular sound (e.g., a violin being played, a bird chirping, etc.). The mathematical model may include several parameters that can be adjusted, and adjustment of the parameters can alter the waveform that is output, resulting in different sounds. In block 220, the system 100 can synthesize an audio event using one or more mathematical models stored in an audio event models database 118. The audio event models database 118 can be stored in a database that is locally stored in the system 100 or can be stored remotely on one or more remote computer systems that the system can access using a data transceiver.

In block 222, the system 100 can use the auditory event compositor to combine any digitized sounds 210 and any synthesized sounds 218 to provide an output signal. The auditory event compositor can include a sound mixer and/or a signal mixer. For example, for a user who wants to hear different species of birds chirping when any birds in his environment are chirping, in block 222, the system 100 may mix a digitized sound 210 of one species of bird with a synthesized sound 218 of a second species of bird. In block 224, the system 100 can output the composite sound signal (e.g., to audio transducers).

Figure 3A:
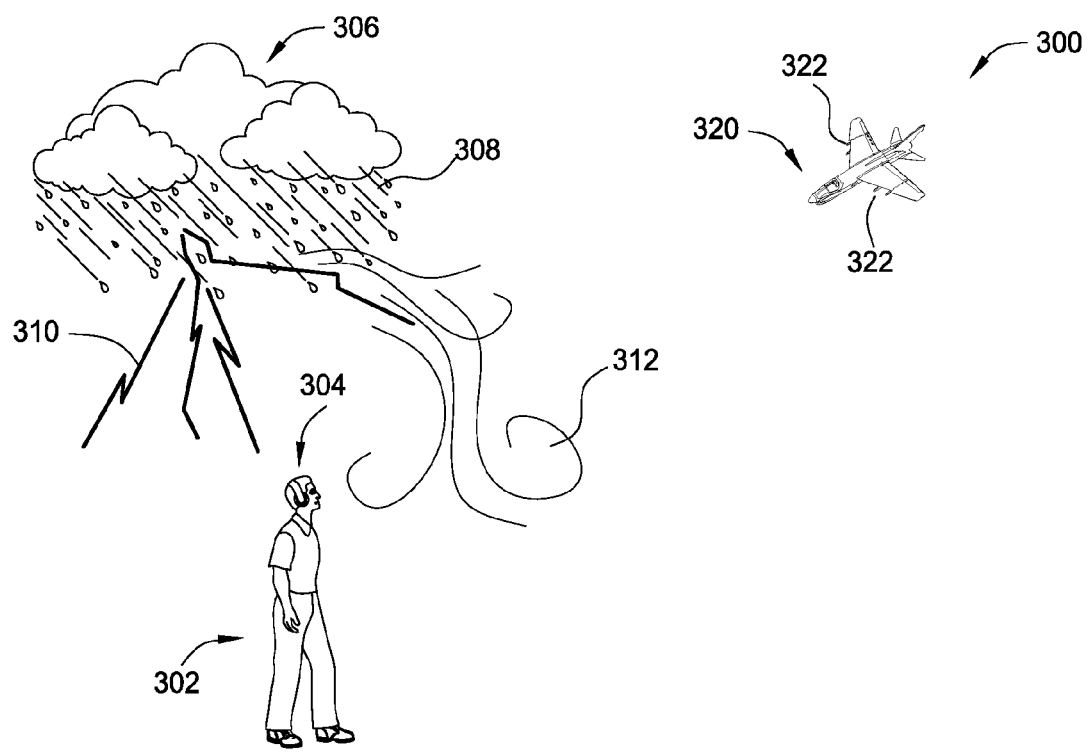
FIG. 3A depicts an exemplary scenario in which a thunderstorm and an airplane flying overhead are proximate to a user, and is used for describing aspects of operation of an augmented reality system.
Figure 3B:
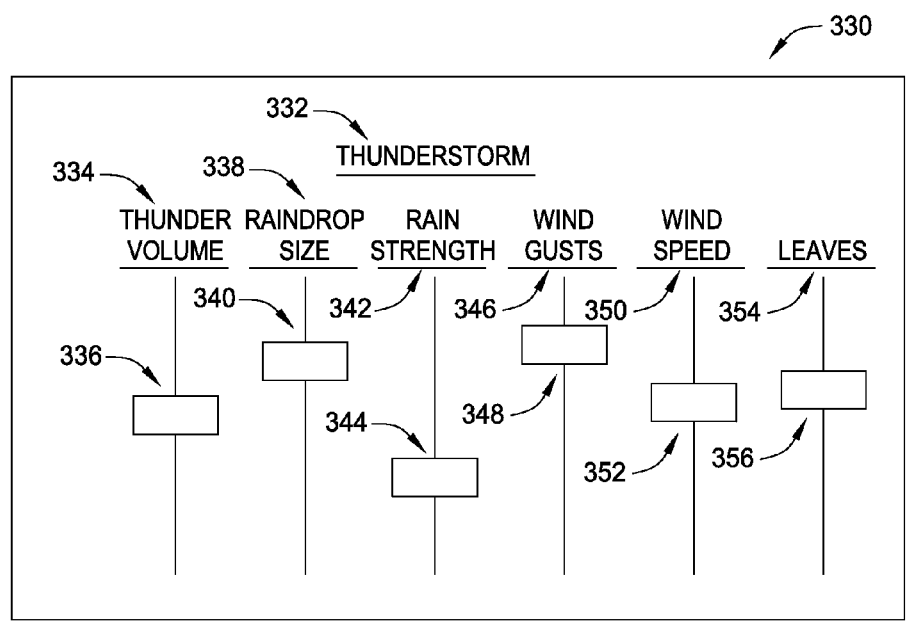
FIG. 3B depicts an exemplary user interface related to the thunderstorm depicted in the scenario shown in FIG. 3A.
Figure 3C:
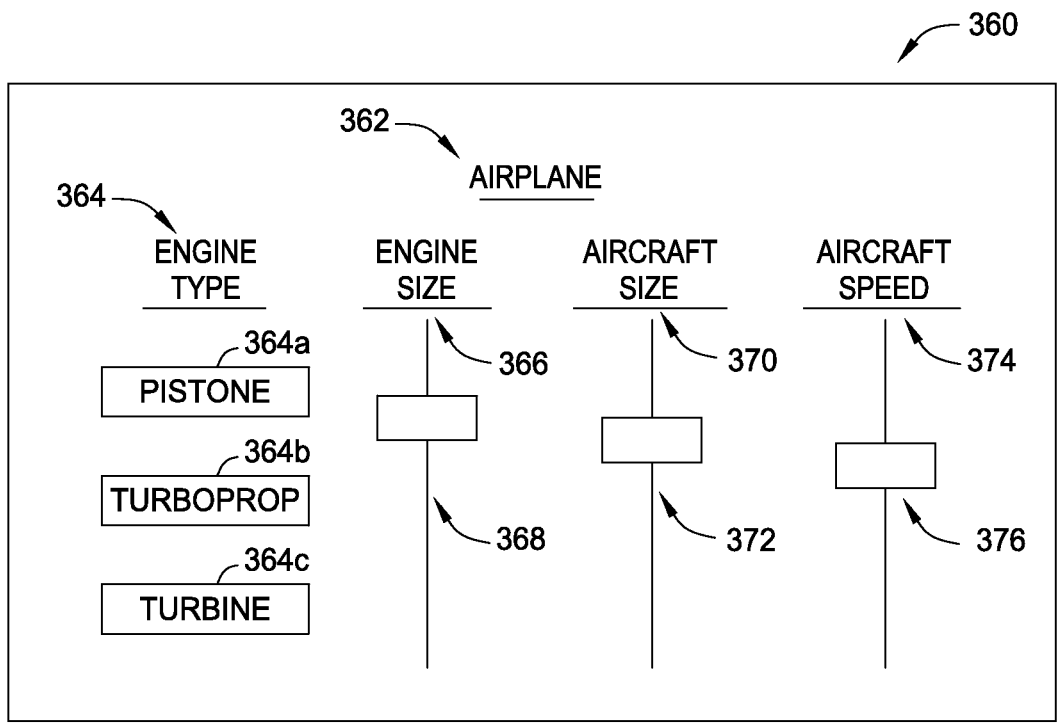
FIG. 3C depicts an exemplary user interface related to the aircraft depicted in the scenario shown in FIG. 3A.

FIGS. 3A-3C depict a scenario 300 where a user 302 of a wearable system 304 is walking. In this scenario, a thunderstorm 306 and an airplane 320 flying overhead are in the user's 302 environment. Referring first to the thunderstorm 306, the system 100 may detect the thunderstorm 306 in the user's 302 environment in several different ways. For example, a digital imager of the system 100 may detect light flashes associated with lightning 310 of the thunderstorm 306. As another example, a microphone or the like of the system 100 may detect sounds of thunder associated with the lightning 310, sounds of rain 308 associated with the thunderstorm 306, and/or sounds of wind 312 associated with the thunderstorm 306. As another example, the system 304 may communicate with a remote computer system the data transceiver to identify the location of the thunderstorm 306 relative to the user 302. For example, the system 304 can include a GPS receiver that can determine the location of the system 304 (and the user 302). The system 304 can communicate the determined location data via a data transceiver to a remote computer system that includes weather information (e.g., weatherchannel.com or the like). In response to the detected thunderstorm 306, the system 304 can provide digitized sound and/or synthesized sound of a thunderstorm to the user 302. The provided digitized sound and/or synthesized sound can be presented to the user in a location specific and correct manner. For example, in certain embodiments, the system 304 can be headphones worn by the user 302. In such a case, sounds of the thunderstorm 306 can be presented in a manner such that the sound(s) are perceived by the user 302 to originate from the actual location of thunderstorm 306. For example, if the thunderstorm 306 is to the left of the user 302, then the sound(s) of the thunderstorm 306 can primarily be reproduced by an audio transducer (e.g., speaker) over and/or in the user's 302 left ear.

Also, as the thunderstorm 306 gets closer to the user 302, the sound(s) of the thunderstorm 306 can generally become louder. Similarly, as the thunderstorm 306 gets further from the user 302, the sound(s) of the thunderstorm 306 can generally become quieter.

Referring now to FIG. 3B, a user interface for the system 304 can provide the user 302 with controls over aspects of a synthesized sound, e.g., a thunderstorm. For example, the user interface 330 can include a touch screen display 330. The touch screen display 330 can display a title field 332 providing a description of sound(s) that can be modified. Continuing with the example of using sounds to augment the experience of a nearby thunderstorm, the user interface may include different parameters that can adjust the synthesized sound. For example, a first parameter may be thunder volume 334 (i.e., how loudly thunder is reproduced, scaled for distance). The touch screen display 330 can display a graphical representation of a slider bar 336 that can adjust the volume of thunder relative to other audible aspects of the synthesized sound of the thunderstorm 306. As another example, a second parameter could be raindrop size 338. In certain instances, larger raindrops may sound different than smaller raindrops when they hit the ground or objects such as trees, cars, etc. The touch screen display 330 can display a graphical representation of a slider bar 340 used to adjust the size of the raindrops in the synthesized sound of the thunderstorm 306. As another example, a third parameter could be rain strength 342 (i.e., a rate of rainfall). Again, the touch screen display 330 can display a graphical representation of a slider bar 344 used to adjust the rain strength 342 in the synthesized sound of the thunderstorm 306. As another example, a fourth parameter could be wind gusts 346 (i.e., how much wind speed that varies). Again, the touch screen display 330 can display a graphical representation of a slider bar 348 used to adjust the amount or frequency of variations of wind speed in the synthesized sound of the thunderstorm 306. As another example, a fifth parameter could be wind speed 350. Again, the touch screen display 330 can display a graphical representation of a slider bar 352 used to adjust the wind speed in the synthesized sound of the thunderstorm 306. As another example, a sixth parameter could correspond to the presence of leaves or other debris 354 being blown about by the wind. Again, the touch screen display 330 can display a graphical representation of a slider bar 356 used to adjust the amount of leaves or other debris in the synthesized sound of the thunderstorm 306 (and ultimately the presence or absence of audio sound of leaves or debris being blown about by the wind).

By manipulating the controls via the user interface (e.g., the touch screen display 330), the user 302 can customize the synthesized sound generated for the thunderstorm 306.

In various instances, the system 304 can automatically modify and/or adjust parameters of a synthesized model to accommodate changing conditions. For example, over time, the thunderstorm 306 may strengthen. As described above, various context sensors such as a digital imager, microphone, working in connection to a weather service can detect the presence and/or location of the thunderstorm 306. The same context sensors may also detect changes in the thunderstorm 306, such as strengthening or weakening of the thunderstorm 306, for example. If, for example, the rainfall rate increases, then the system 304 can respond by automatically increasing the rain strength (parameter 342) to indicate to the user 302 the change in the thunderstorm 306.

Referring again to FIG. 3A, the depicted scenario 300 also includes an aircraft 320 flying overhead as part of the user's environment. In the example, the aircraft 320 includes two engines 322. Again, the system 304 can use one or more context sensors to detect the presence of the aircraft 320 in the user's 302 environment. For example, the system 304 could use a digital imager to visually identify the aircraft 320 in the sky. As another example, the system 304 could use a microphone to audibly detect the aircraft 320 (e.g., the sounds of the aircraft's 320 engines 322). As yet another example, the system 304 could detect the aircraft 320 by referencing a database of flight information. As discussed above, the system 304 may use a GPS receiver to determine a location of the system 304 and the user 302. The system 304 may use a data transceiver to communicate with a remote computer system (e.g., flight aware.com) that includes a database of flights, including real-time or near real-time updates on flights in progress. The system 304 may use the determined location and/or orientation to query the database and retrieve information for the aircraft flying near the location of the user 302.

Similar to the discussion above regarding thunderstorm 306, the system 304 can provide the user 302 with a digitized sound and/or synthesized sound of the aircraft 320. Referring to FIG. 3C, in the event the sound of the aircraft 320 includes a synthesized sound, the user interface can provide controls for the user 302 to manipulate to adjust aspects of the synthesized sound. FIG. 3C depicts a touch screen display 360 with various controls to enable the user 302 to adjust aspects of the synthesized sound of the aircraft 320. The touch screen display 316 can display a category field 362 that identifies the parameters of the sound(s) to be adjusted. For example, a first parameter could be an engine type 364. For example, an aircraft may be powered by piston engines, turboprop engines, or gas turbine engines. The touch screen display 360 can display three graphical icons 364a, 364b, and 364c that enable the user 302 to select piston powered engine sounds, turboprop engine sounds, or gas turbine engine sounds, respectively, in the synthesized sound of the aircraft 320. As another example, a second parameter can be engine size 366. Aircraft with larger engines may sound different than aircraft with smaller engines. The touch screen display 360 can display a graphical representation of a slider bar 368 used to adjust the size of the engines 322 of the aircraft 320 in the synthesized sound of the aircraft 320. As another example, a third parameter could be aircraft size 370. A larger aircraft may sound different than a smaller aircraft (e.g., a larger aircraft may have more wind noise associated with it than a smaller aircraft). The touch screen display 360 can display a graphical representation of a slider bar 372 used to adjust the aircraft size in the synthesized sound of the aircraft 320. As another example, a fourth parameter could be aircraft speed 374. An aircraft may sound different as it flies at different speeds. The touch screen display 360 can display a graphical representation of a slider bar 376 used to adjust the aircraft speed in the synthesized sound of the aircraft 320.

As the aircraft 324 flies over the user 302, the system 304 can adjust the digitized and/or synthesized sound for the aircraft such that the user 302 perceives the sound to be coming from the location of the aircraft 320. Depending on the current flying altitude of the aircraft 320 it may take several seconds for the actual sound of the aircraft 320 to reach the user 302. In such instances, it may be difficult for the user 302 to visually spot the aircraft because he is looking at a spot from which the actual sound appears to be coming from, which is behind the actual location of the aircraft 320. In various embodiments, the system 304 can adjust the digitized and/or synthesized sound for the aircraft 320 such that the user 302 perceives the sound as coming from the actual location of the aircraft 320 (i.e., as if sound from the aircraft traveled instantaneously to the user 302).

The system 304 may also provide the user 302 with information about the aircraft 320. For example, the system 304 may retrieve information from a remote computer system (e.g., flightaware.com) that is tracking the aircraft in real time or near real time. The information could include the airline, the flight number, the departure airport, the arrival airport, the current altitude, heading, and airspeed, for example. The system 304 may receive the information in a text format, and a sound synthesizer of the system 404 may perform a text-to-speech operation on the text to provide the information in an audio format to the user 302.

As discussed above with reference to FIG. 1, embodiments of the system can include an audio event compositor (such as audio event compositor 112) that can combine multiple sounds. For example, the system 304 may use a digitized sound (e.g., an .MP3 file) for the aircraft 320 and a synthesizer model for the thunderstorm 306. The auditory event compositor 112 can combine the digitized sound signal of the aircraft 320 and the synthesized sound of the thunderstorm 306 to provide an audio augmented reality sound presentation to the user 302.

By providing the user 302 with an audio augmented reality presentation, the system 304 may make the user 302 aware of the thunderstorm 306 and/or the aircraft 320 before the thunderstorm 306 and/or aircraft 320 are normally perceptible to the user 302. For example, a microphone of the system 304 may detect rumbles of thunder from the thunderstorm 306 that are too distant (and therefore too quiet) for the user 302 to hear. Similarly, the system 304 may visually and/or audibly detect the aircraft 320 before the user 302 can see and/or hear the aircraft 320.

Figure 4A:
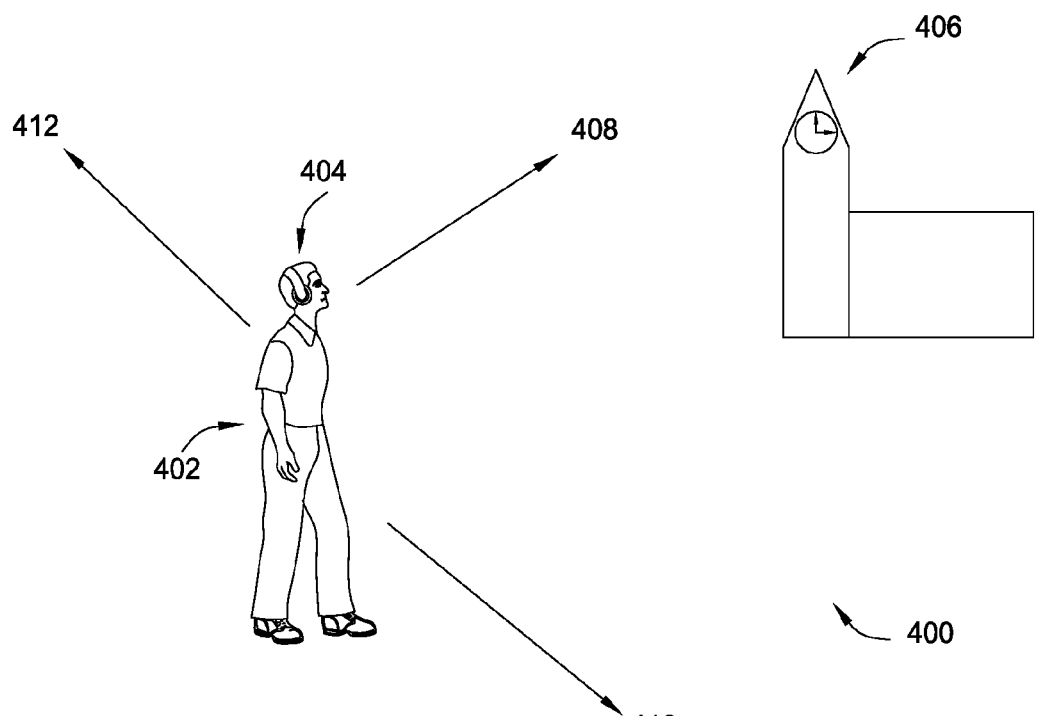
FIG. 4A depicts an exemplary scenario in which a user is proximate to Big Ben in London, and is used for describing aspects of operation of an augmented reality system.

FIG. 4A depicts another scenario 400 providing a user 402 with an audio augmented reality while wearing a wearable system 404. In this scenario, the user 402 is near a famous landmark, such as Big Ben 406 in London. The system 404 can include context sensors that can detect the proximity to Big Ben 406. For example, the system 404 can include a digital imager that may capture and recognize one or more images of Big Ben 406 in the user's 402 environment. As another example, the system 404 can include a microphone that can detect the sound of Big Ben's 406 chimes and/or clock mechanism. As another example, the system 404 can include a GPS receiver that can detect the location of the system 404 (and therefore the user 402). The system 404 can communicate with a database that can store geolocations (e.g., latitudes and longitudes) of landmarks and other well-known places. The database may be stored on the system 404 or located on a remote computer system. The system 404 can also include a data transceiver (e.g., a Wi-Fi or cellular data connection) that can retrieve data from the database. Similar to the scenario 300 shown in FIG. 3A, the system 404 in this scenario 400 may detect Big Ben 406 before the user 402 detects and/or perceives Big Ben 406.

As discussed above, the system 404 can provide digitized sounds and/or synthesized sounds related to Big Ben 406 to the user 402. Various embodiments of the system 404 can modify the sound to indicate a bearing of the user 402 relative to Big Ben 406. For example, if the user 402 is walking toward Big Ben 406 (as indicated by arrow 408), then the system 404 can present the provided sound to the user's 402 ears such that the sound is perceived as coming from directly ahead of the user 402. Similarly, if the user 402 is walking with Big Ben 406 on the right (as indicated by arrow 412), then the system 404 can present the sound such that the sound is perceived as coming from the user's 402 right. Similarly, if the user 402 is walking with Big Ben 406 on the left (as indicated by arrow 410), then the system 404 can present the sound such that the sound is perceived as coming from the user's 402 left.

Figure 4B:
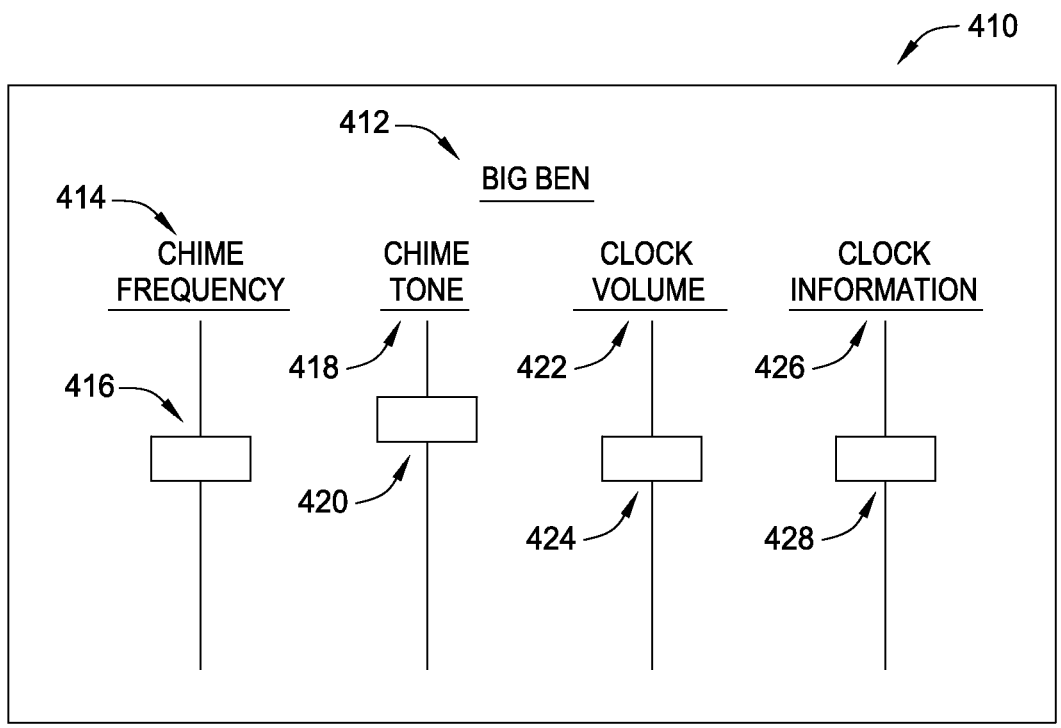
FIG. 4B depicts an exemplary user interface related to Big Ben in the scenario shown in FIG. 4A.

Referring now to FIG. 4B, a user interface for the system 404 can provide the user 402 with controls over aspects of synthesized sound(s) of Big Ben. For example, the user interface can include a touch screen display 410. The touch screen display 410 can display a title field 412 that provides the user with a description of the sound(s) that are modifiable. In the scenario of a user being near Big Ben, the user interface may include several different parameters that can adjust the synthesized sound. For example, a first parameter could be chime frequency 414 (i.e., how often synthesized chimes of Big Ben are played). For example, if the user 402 is trying to find his way to Big Ben 406, then the user 406 may want the chimes to play nearly continuously. The touch screen display 410 can display a graphical representation of a slider bar 416 used to adjust the frequency of chiming of the synthesized sound of Big Ben 406. As another example, a second parameter could be chime tone 418 (i.e., how the chimes sound). Again, the touch screen display 410 can display a graphical representation of a slider bar 420 used to adjust the tone of the chimes of the synthesized sound of Big Ben 406. As another example, a third parameter could be clock volume 422 (i.e., how loud the clock mechanism sounds are). Again, the touch screen display for 10 can display graphical representation of a slider bar 424 used to adjust the volume of the clock mechanism of the synthesized sound of Big Ben 406. As another example, a fourth parameter may be clock information 426. For example, a sound synthesizer of the system 404 may perform a text-to-speech operation on a written description of Big Ben 406 (e.g., a history of the clock). As discussed above, the system 404 may include a data transceiver that can be used to communicate with remote computer systems. Embodiments of the system 404 may use the data transceiver to communicate with a remote computer system that includes such a written description of Big Ben 406. As an example, the data transceiver may access a Wikipedia® Internet page related to Big Ben 406 and perform a text-to-speech conversion on the page.

Figure 5A:
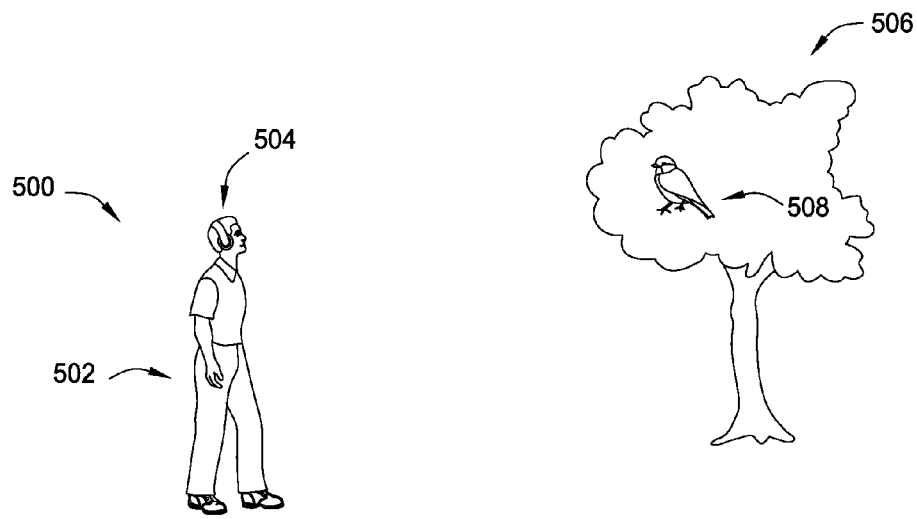
FIG. 5A depicts an exemplary scenario in which a user is proximate to trees with a bird chirping, and is used for describing aspects of operation of an augmented reality system.

FIG. 5A depicts another scenario 500 providing a user 502 with an audio augmented reality. In this example the user is walking near trees (e.g., in a forest). As shown, a bird 508 is in a tree 506 and may be chirping or singing. As described above, the system 504 may use context sensors to detect the bird 508. For example a digital imager may detect an image of the bird 508 in the tree 506. As another example, a microphone may detect the sounds of the bird 508 chirping or singing. As discussed above, the digital imager and/or microphone may be highly sensitive, and may detect the bird 508 before the user 502 would otherwise see and/or hear the bird. Again, the system 504 may provide digitized sound and/or synthesized sound of the bird 508 to the user 502.

Figure 5B:
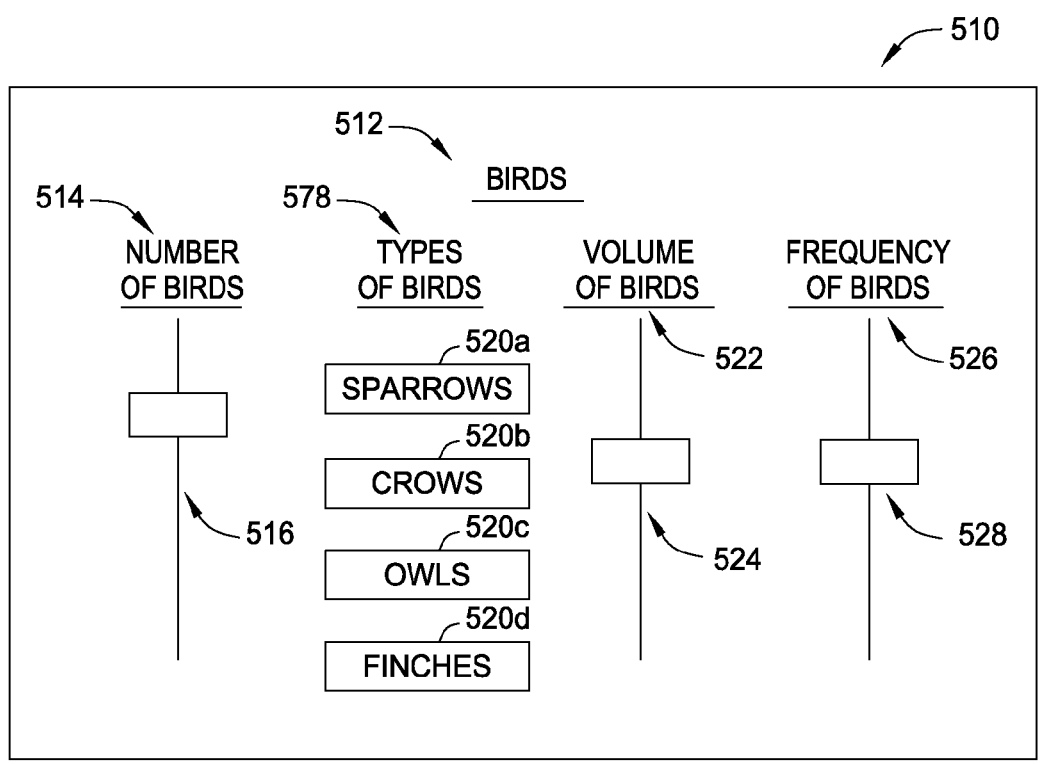
FIG. 5B depicts an exemplary user interface related to the birds in the scenario shown in FIG. 5A.

FIG. 5B illustrates a user interface that the user 502 may use to control aspects of a synthesized sound of the bird 508. The user interface can include a touch screen display 510. The touch screen display 410 can display a title field 512 that provides the user with a description of the sound(s) that are modifiable. In the exemplary scenario 500, the user interface may include several different parameters that the user 502 can adjust to affect the synthesized sound. For example, a first parameter could be a number of birds 514 that are chirping and/or singing. The user 502 may want to hear more than just the single bird 508. Thus, the touch screen display 510 can display a graphical representation of a slider bar 516 used to adjust the number of birds in the synthesized sound of the bird 508. As another example, a second parameter could be types of birds 518 that are chirping and/or singing. The touch screen display 510 can include a plurality of graphical icons that the user can touch to toggle different bird sounds. For example, the first icon 520a can be toggled to include the sound of sparrows, the second icon 520b can be toggled to include the sound of crows, a third icon 520c can be toggled to include the sound of owls, and a fourth icon 520d can be toggled to include the sound of finches in the synthesized sound of the bird 508. As another example, a third parameter could be a volume of the birds 522. The touch screen display 510 can include a graphical representation of a slider bar 524 used to adjust the volume of the birds in the synthesized sound of the bird 508. As yet another example, a fourth parameter could be a frequency with which the birds chirp and/or singing 526. The touch screen display 510 can include a graphical representation of a slider bar 528 used to adjust the frequency with which birds chirp and/or sing in the synthesized sound of the bird 508.

In various embodiments, the system 504 may figure out the species of the bird 508 and provide this information to the user 502 (e.g., as an audio message and/or as a text message on the touch screen display). For example, the system 504 may include a database of bird sounds for different species of birds. The system 504 can compare the captured sound of the bird 508 to the bird sounds in the database to identify the species. The database of bird sounds could also be remote, and the system 504 could use a data transceiver to transmit the captured sound of the bird 508 to the database and receive a species identity from the database.

In the examples described above, embodiments of systems can provide awareness to users of events, objects, or the like in their environment before the user would otherwise be aware of such events, objects, or the like. Furthermore, embodiments of systems described herein can enable the user to modify his auditory experience related to the events, objects, or the like by modifying aspects of a sound presentation that represents the events, objects, or the like.

In the examples described above, the systems are described in the context of a wearable device. For example, the user may wear headphones that include audio transducers arranged over or in the user's ears. A housing for the headphones may include the remainder of the system, including context sensors, a user preference database, a sound file database, and an audio event models database. The housing for the headphones may also include one or more computer processors that prepare and output digitized and/or synthesized sounds to the user. In various embodiments, the system may comprise a controller that receives inputs from various sensors and outputs the digitized and/or synthesized sounds to the user. For example, the user may connect to the controller headphones, a digital camera, and/or a microphone. The controller can use the camera and the microphone to detect context in the user's environment (i.e., detect various events, objects, and the like), prepare digitized and/or synthesized sounds for presentation to the user, and output the sounds to the user's headphones. In various embodiments, the controller can be a purpose built housing containing purpose built software and hardware. In various other embodiments, the controller can run on a general-purpose processor, such as a processor found in a device, such as a smart phone, tablet, laptop, or the like, and computer software may run on the device (e.g., as an application). Embodiments of the systems described herein may also be arranged in a vehicle such as a car, bicycle, airplane, or the like.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
a computer processor;
a memory that stores at least one user preference;
at least one acoustic transducer;
at least one context sensor that acquires sensor data; and
at least one database storing a plurality of data structures, wherein each data structure included in the plurality of data structures stores auditory data associated with a different sound,
wherein the computer processor:
determines, based on the sensor data, a type of environment;
selects, based on the type of environment and the at least one user preference, at least one of the plurality of data structures that stores a first audio recording of a sound of at least one of an object and an event included in the type of environment; and
transmits an audio signal that corresponds to the first audio recording to the at least one acoustic transducer.

2. The system of claim 1, wherein the plurality of data structures comprise a plurality of audio recordings, wherein the at least one user preference includes an association of a particular audio recording with a particular location or environmental context, and wherein the computer processor processes the particular audio recording upon a determined location or environmental context of the user corresponding to the particular location or environmental context.

3. The system of claim 1, wherein the plurality of data structures comprise at least one sound synthesizer model that simulates a sound when processed by the computer processor, wherein the at least one user preference includes an association of a particular sound synthesizer model with a particular location or environmental context, and wherein the computer processor processes the particular sound synthesizer model upon a determined location or environmental context of the user corresponding to the particular location or environmental context.

4. The system of claim 3, wherein at least one of the plurality of sound synthesizer models is modified based on the user preference, and wherein the modified sound synthesizer model generates a modified simulated sound.

5. The system of claim 1, wherein at least one context sensor comprises a global positioning system (GPS) receiver.

6. The system of claim 5, wherein the computer processor identifies the type of environment by comparing the determined location of the user to a database of locations.

7. The system of claim 1, wherein the at least one database is stored on the memory.

8. The system of claim 1, further comprising a transceiver, wherein the at least one database comprises a remote database, and wherein the computer processor communicates with the remote database using the transceiver.

9. A controller, comprising:
a first signal input that receives a first signal that indicates at least one user preference;
a second signal input that receives sensor data;
a signal output that drives at least one acoustic transducer; and
computer logic that:
determines, based on the sensor data, a type of environment;
processes a data structure, selected from a plurality of data structures based on the type of environment and the at least one user preference, wherein the data structure stores a first audio recording of a sound of at least one of an object and an event included in the type of environment, and
generates an audio signal that corresponds to the first audio recording.

10. The controller of claim 9, further comprising a computer memory, wherein the plurality of data structures are stored in the computer memory.

11. The controller of claim 9, further comprising a transceiver, wherein the plurality of data structures are stored in a remote computer memory, and wherein the computer logic retrieves the selected data structure from the remote computer memory.

12. The controller of claim 9, wherein the first signal is provided by a user interface that enables a user to indicate at least one preference.

13. The controller of claim 9, wherein the second signal is provided by a context sensor, wherein the context sensor comprises a camera that captures an image of at least one of a location and an environmental context, and wherein the second signal includes the captured image.

14. The controller of claim 9, further comprising a wearable housing, wherein the first signal input, the second signal input, and the signal output are arranged on the housing, and wherein the computer logic is arranged within the housing.

15. A non-transitory computer readable medium containing instructions that, when executed by a processor, cause the processor to perform the steps of:
receiving at least one user preference;
determining a type of environment of the user based on sensor data received from a context sensor;
selecting a data structure from a plurality of data structures, based on the type of environment of the user and the at least one user preference, wherein the data structure stores a first audio recording of a sound of at least one of an object and an event included in the type of environment; and
processing the first audio recording to generate an audio signal for output to an acoustic transducer.

16. The non-transitory computer readable medium of claim 15, wherein the at least one user preference includes a first preference, wherein the first preference is adjustable on a continuum between a first limit and a second limit.

17. The non-transitory computer readable medium of claim 15, wherein the type of environment is determined based on a location of the user.

18. The system of claim 1, wherein the at least one context sensor comprises at least one of an acoustic sensor and an image sensor.

19. The system of claim 18, wherein the computer processor determines the type of environment by identifying at least one of an object included in image data acquired by the image sensor and a sound included in acoustic data acquired by the acoustic sensor.

* * * * *